(12) United States Patent
Kojokaro et al.

(10) Patent No.: US 7,920,628 B2
(45) Date of Patent: Apr. 5, 2011

(54) NOISE FILTER FOR VIDEO COMPRESSION

(75) Inventors: Gideon Kojokaro, Ramat Hasharon (IL); David Drezner, Raanana (IL)

(73) Assignee: Broadcom Corporation, Irvine, CA (US)

( * ) Notice: Subject to any disclaimer, the term of this patent is extended or adjusted under 35 U.S.C. 154(b) by 1615 days.

(21) Appl. No.: 11/206,177

(22) Filed: Aug. 18, 2005

(65) Prior Publication Data

US 2007/0025447 A1 Feb. 1, 2007

Related U.S. Application Data

(60) Provisional application No. 60/703,425, filed on Jul. 29, 2005.

(51) Int. Cl.
*H04N 7/12* (2006.01)
(52) U.S. Cl. ............... 375/240.16; 375/240.29
(58) Field of Classification Search .......... 375/240, 375/240.01, 240.12, 240.16, 240.29
See application file for complete search history.

(56) References Cited

U.S. PATENT DOCUMENTS 6,396,876 B1 * 5/2002 Babonneau et al. ..... 375/240.29

* cited by examiner

*Primary Examiner* — Allen Wong
(74) *Attorney, Agent, or Firm* — Sterne, Kessler, Goldstein & Fox PLLC

(57) ABSTRACT

A method and system for reducing noise in a video stream comprising images divided into macroblocks, where each macroblock includes luma and chroma blocks and each block is comprised of pixels. The method comprises determining correlation of a macroblock with a reference macroblock, comparing its motion vectors to a predetermined threshold, computing a residual signal of the macroblock by subtracting the macroblock from a predicted macroblock, computing a variance of a residual signal of the macroblock, comparing the variance of the residual signal to another predetermined threshold, determining a filter strength for the macroblock based on one or more of factors such as correlation, motion vector size and variance of the residual signal and filtering the macroblock using a filter of appropriate strength.

20 Claims, 7 Drawing Sheets

Correlated Motion Vectors

Uncorrelated Motion Vectors

Correlated vs. Uncorrelated Motion Vectors

FIG. 6

NOISE FILTER FOR VIDEO COMPRESSION

CROSS-REFERENCE TO RELATED APPLICATION

This application claims the benefit of U.S. Provisional Application No. 60/703,425, filed Jul. 29, 2005, which is incorporated herein by reference.

FIELD OF THE INVENTION

This invention generally relates to video compression and more specifically to reducing noise in a video stream during compression.

BACKGROUND OF THE INVENTION

A visual information source requires a transmission or a storage medium to convey its message to the observer. The fidelity of transmission and reproduction of the message is closely related to and dependent on the available medium capacity and the manner in which it is used. In the digital world the medium capacity is expressed in bits per second or the bit rate. The transmission of visual information can be improved by compressing the video signal and transmitting the compressed signal. The goal of digital video compression is to represent an image with as low a bit rate as possible, while preserving an appropriate level of picture quality for a given application. Compression is achieved by identifying and removing redundancies.

A bit rate reduction system operates by removing redundant information from the signal at the encoder prior to transmission and re-inserting it at the decoder. An encoder and decoder pair are referred to as a 'codec'. In video signals, two distinct kinds of redundancy can be identified.

i. Spatial and temporal redundancy where pixel values are not independent, but are correlated with their neighbors both within the same frame and across frames. To some extent, the value of a pixel is predictable given the values of neighboring pixels.
  ii. Psycho-visual redundancy where the human eye has a limited response to fine spatial detail and is less sensitive to detail near object edges or around shot-changes. Consequently, controlled impairments introduced into the decoded picture by the bit rate reduction process are not visible to a human observer.

At its most basic level, compression is performed when an input video stream is analyzed and information that is indiscernible to the viewer is discarded. Each event is then assigned a code where commonly occurring events are assigned fewer bits and rare events are assigned more bits. These steps are commonly referred to as signal analysis, quantization and variable length encoding. Common methods for compression include discrete cosine transform (DCT), vector quantization (VQ), fractal compression, and discrete wavelet transform (DWT).

Most recorded media content tends to contain some noise. Noise is mostly random, unwanted and spurious variation in a signal. Common sources of noise are electrical and electromagnetic signals external to the recorded media. Noise does not compress well and most video compression systems utilize additional storage space and computational resources to reduce the noise level present in the signal. Noise reduction and filtering can substantially improve the video quality received by the viewer if the right techniques are applied to remove noise. Selectively removing noise is a challenge because noise shares the same space as valuable picture data.

An ideal noise reduction process will allow powerful suppression of random noise while preserving clean video content. Good noise reduction means applying filters that preserve details such as edge structure in an image while avoiding blurring, trailing or other effects adverse to the fidelity of the image. Most filtering algorithms such as Motion Compensated Temporal Filtering (MCTF) add a heavy pre-filtering computational load on the encoder. This is a common problem with most temporal processors. What is needed is a new method to efficiently reduce noise while encoding a video stream.

BRIEF SUMMARY OF THE INVENTION

The invention comprises a method and system for reducing noise a video stream comprising images divided into macroblocks, where each macroblock includes luma and chroma blocks and each block is comprised of pixels. The method comprises determining correlation of a macroblock with a reference macroblock, comparing its motion vectors to a predetermined threshold, computing a residual signal of the macroblock by subtracting the macroblock from a predicted macroblock, computing a variance of a residual signal of the macroblock, comparing the variance of the residual signal to a predetermined threshold, determining a filter strength for the macroblock based on one or more of factors such as correlation, motion vector size and variance of the residual signal and filtering the macroblock using a filter of appropriate strength.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 6 illustrates example filtering matrices.

Figure 1:
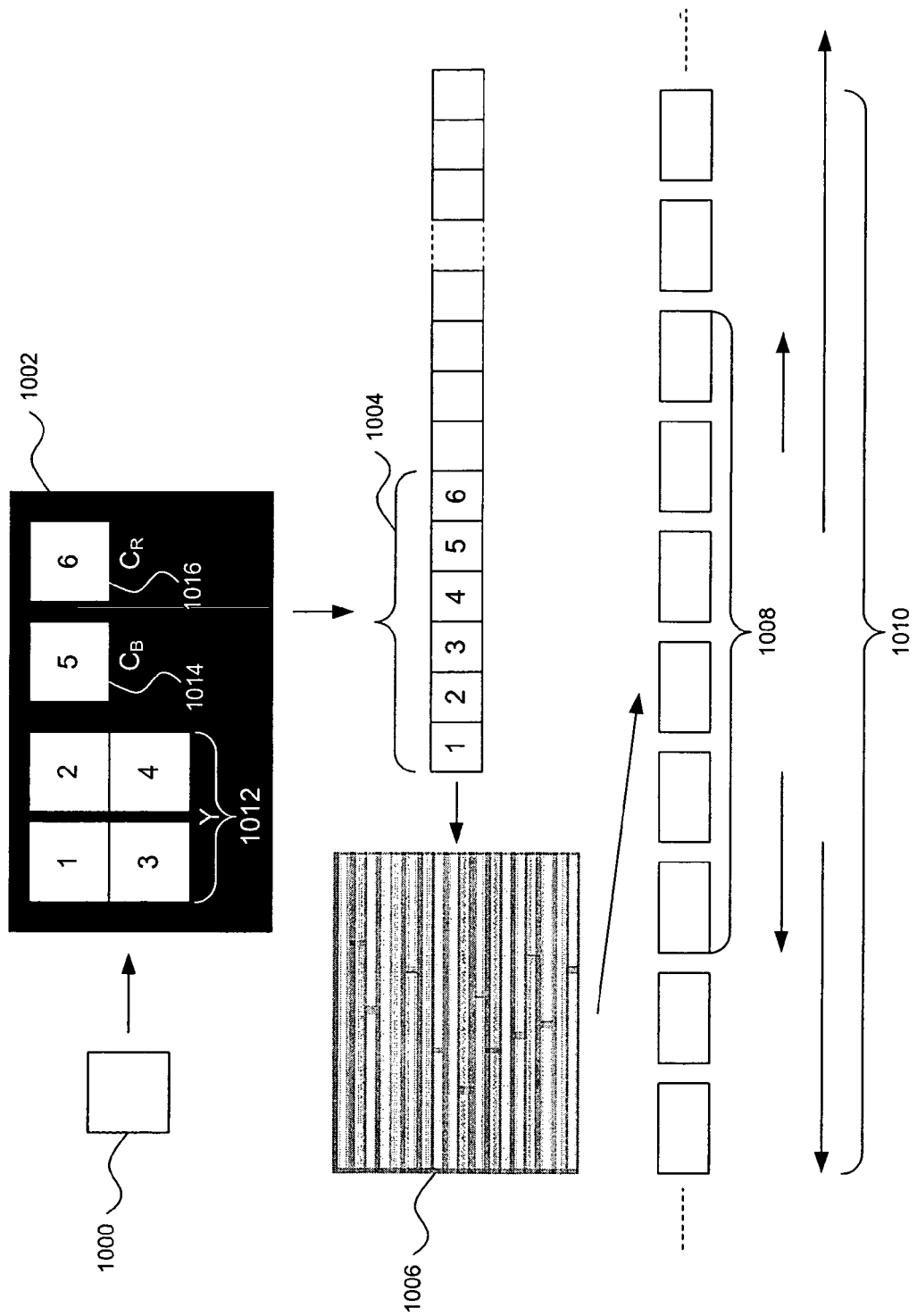
FIG. 1 illustrates an MPEG-2 video sequence.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Table of Contents

I. Introduction
II. Video Compression
III. Compression Standards
IV. MPEG-2 Compression
IV. a) MPEG-2 data structure
IV. b) MPEG-2 Encoder
IV. c) MPEG-2 Decoder
V. Example Embodiments
V. a) Parameters
V. b) Motion Correlation
V. c) Relative Motion Vector Size
V. d) Variance of Residual Signal
V. e) Classifying Macroblocks
V. f) Filtering
VI. Alternate Embodiments
VII. Conclusion

I. INTRODUCTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention will be described in terms of an embodiment applicable to the reduction of noise content by filtering in the DCT domain thereby enhancing video quality efficiently by using data generated during the process of encoding a video stream. It will be understood that the essential concepts disclosed herein are applicable to a wide range of compression standards, codecs, electronic systems, architectures and hardware elements. Thus, although the invention will be disclosed and described in terms of identifying, qualifying and selectively filtering noise from images of a video stream using varying filter strengths, the invention is not limited to this field.

II. VIDEO COMPRESSION

Video compression techniques can be broadly categorized as lossless and lossy compression techniques. Most video compression techniques use a combination of lossless and lossy techniques to reduce the bit rate. These techniques can be used separately or they can be combined to design very efficient data reduction systems for video compression. Lossless data compression is a class of data compression algorithms that allow the original data to be reconstructed exactly from the compressed data. A lossy data compression method is one where compressing a file and then decompressing it produces a file that may be different from the original, but has sufficient information for its intended use. In addition to compression of video streams, lossy compression is used frequently on the internet and especially in streaming media and telephony applications. Some of the lossy and lossless compression techniques include but are not limited to:

a. Blanking removal: a technique in which the horizontal and vertical blanking areas of an image are not recorded or transmitted.

b. Discrete cosine transform (DCT): a lossy transform coding compression algorithm that samples an image at regular intervals, analyzes the frequency components present in the sample, and discards those frequencies which do not affect the image as the human eye perceives it.

c. Statistical Coding (or Entropy Coding): a technique that takes advantage of the statistical distribution of pixel values. Some data values can occur more frequently than others and therefore this method uses a coding technique that uses fewer bits for data values that occur more frequently.

d. Variable-length coding (VLC): also called Huffman coding or entropy coding is a compression technique that assigns fewer bits to code frequently occurring coefficient values and more bits to code infrequently occurring coefficient values.

e. Run-length coding (RLC): a compression technique that relies on the repetition of the same data sample value to generate special codes that indicate the start and end of a repeated value.

f. Truncation: a compression technique that reduces data by reducing the number of bits per pixel.

g. DPCM (Differential Pulse Code Modulation): a predictive compression technique that operates at the pixel level and sends only the difference between successive pixels.

h. Vector quantization (VQ): a lossy compression algorithm that analyzes an array of data instead of individual values. VQ algorithms compress redundant data while at the same time retaining the data stream's original intent.

i. Fractal compression: a form of vector quantization and is also a lossy compression algorithm. Compression is performed by locating self-similar sections of an image and then using a fractal algorithm to generate sections.

j. Discrete Wavelet Transform (DWT): a compression technique that mathematically transforms an image into frequency components.

k. Sample subsampling: an effective data reduction method which is applied to chrominance signals resulting in the 4:2:0 and 4:1:1 formats.

l. Requantizing: a process that assigns more bits to low frequency coefficient values and fewer bits to high frequency coefficient values thereby reducing the effective bit rate of a video stream.

Most compressions standards incorporate one of more of the above mentioned compression techniques to reduce the size of images and/or the bit rate of a video stream.

III. COMPRESSION STANDARDS

Image and video compression standards have been developed to facilitate easier transmission and/or storage of digital media and allow the digital media to be ported to discrete systems. Some of the most common compression standards include but are not limited to the following:

JPEG stands for Joint Photographic Experts Group. JPEG is a lossy compression technique used for full-color or grayscale images, by exploiting the fact that the human eye will not notice small color changes. JPEG, like all compression algorithms, involves eliminating redundant data. JPEG, while designed for still images, is often applied to moving images, or video. JPEG 2000 provides an image coding system using compression techniques based on the use of wavelet technology.

MPEG (Moving Picture Experts Group) is the most common video compression standard. MPEG involves fully encoding only key frames through the JPEG algorithm and estimating the motion changes between these key frames. Since minimal information is sent between every four or five frames, there is a significant reduction in the bits required to describe the image. Consequently, compression ratios above 100:1 are common.

An MPEG encoder may make a prediction about an image and transform and encode the difference between the prediction and the image. The prediction accounts for movement within an image by using motion estimation. Because a given image's prediction may be based on future images as well as past ones, the encoder must reorder images to put reference images before the predicted ones. The decoder puts the images back into display sequence. It takes on the order of 1.1-1.5 billion operations per second for real-time MPEG encoding.

Currently there are five MPEG standards in use or in development. Each compression standard was designed with a specific application and bit rate in mind, although MPEG compression scales well with increased bit rates. The different MPEG standards are described below:

a. MPEG-1 is designed for a 1.5 Mbit/sec standard for the compression of moving pictures and audio.
b. MPEG-2 is designed for a 1.5 to 15 Mbit/sec standard on which Digital Television set top boxes and DVD compression are based. The process of MPEG-2 coding will be described in detail below with reference to an embodiment of the invention.
c. MPEG-4 is a standard for multimedia and internet compression.
d. MPEG-7 also known as Multimedia Content Description Interface is a standard that provides a framework for multimedia content that includes information on content manipulation, filtering and personalization, as well as the integrity and security of the content.
e. MPEG-21 also known as the Multimedia Framework describes the elements needed to build an infrastructure for the delivery and consumption of multimedia content, and how they will relate to each other.

DV or Digital Video is a high-resolution digital video format used with video cameras and camcorders.

H.261 is a standard designed for two-way communication over ISDN lines (for video conferencing) and supports data rates which are multiples of 64 Kbit/s.

H.263 is based on H.261 with enhancements that improve video quality over modems.

DivX is a software application that uses the MPEG-4 standard to compress digital video, so it can be downloaded over the internet with no reduced visual quality.

IV. MPEG-2 COMPRESSION

The MPEG-2 codec uses a combination of lossless and lossy compression techniques to reduce the bit rate of a video stream. MPEG-2 is an extension of the MPEG-1 international standard for digital compression of audio and video signals. The most significant enhancement from MPEG-1 is its ability to efficiently compress interlaced video. MPEG-2 scales well to HDTV resolution and bit rates, obviating the need for an MPEG-3. MPEG-2 provides algorithmic tools for efficiently coding interlaced video, supports a wide range of bit rates and provides for multi-channel surround sound coding.

IV. a) MPEG-2 Data Structure

FIG. 1 illustrates the composition of a 4:2:0 MPEG-2 video sequence 1010. The MPEG-2 data structure is made up of six hierarchical layers. These layers are the block 1000, macroblock 1002, slice 1004, picture 1006, group of pictures (GOP) 1008 and the video sequence 1010.

Luminance and chrominance data of an image in the 4:2:0 format of a MPEG-2 video stream are separated into macroblocks that each consist of four luma (Y) blocks 1012 of 8×8 pixel values in a window of 16×16 pixels of the original picture and their associated color difference blue chroma ($C_B$) block 1014 and red chroma ($C_R$) block 1016. The number of chroma blocks in the macroblock depends on the sampling structure (e.g., 4:4:4, 4:2:2 or 4:2:0). Profile information in the sequence header selects one of the three chroma formats. In the 4:2:0 format as shown in FIG. 1, a macroblock consists of 4 Y blocks 1012, 1 $C_B$ block 1014 and 1 $C_R$ block 1016. In the 4:2:2 format a macroblock consists of 4 Y blocks, 2 $C_R$ blocks and 2 $C_B$ blocks. In the 4:4:4 format a macroblock consists of 4 Y blocks, 4 $C_R$ blocks and 4 $C_B$ blocks.

The slice 1004 is made up of a number of contiguous macroblocks. The order of macroblocks within a slice 1004 is the same as that in a conventional television scan: from left to right and from top to bottom. The picture, image or frame 1006 is the primary coding unit in the video sequence 1010. The image 1006 consists of a group of slices 1004 that constitute the actual picture area. The image 1006 also contains information needed by the decoder such as the type of image (I, P or B) and the transmission order. Header values indicating the position of the macroblock 1002 within the image 1006 may be used to code each block. There are three image, picture or frame 1006 types in the MPEG-2 codec:

a. 'Intra' pictures (I-pictures) are coded without reference to other pictures. Moderate compression is achieved by reducing spatial redundancy, but not temporal redundancy. They can be used periodically to provide access points in the bit stream where decoding can begin.
b. 'Predictive' pictures (P-pictures) can use the previous I or P-picture for motion compensation and may be used as a reference for further prediction. Each block in a P-picture can either be predicted or intra-coded. By reducing spatial and temporal redundancy, P-pictures offer increased compression compared to I-pictures.
c. 'Bidirectionally-predictive' pictures (B-pictures) can use the previous and next I or P-pictures for motion-compensation, and offer the highest degree of compression. Each block in a B-picture can be forward, backward or bidirectionally predicted or intra-coded. To enable backward prediction from a future frame, the coder reorders the pictures from their natural display order to a bit stream order so that the B-picture is transmitted after the previous and next pictures it references. This introduces a reordering delay dependent on the number of consecutive B-pictures.

The GOP 1008 is made up of a sequence of various combinations of I, P and B pictures. It usually starts with an I picture which provides the reference for following P and B pictures and identifies the point for switching and tape editing. GOPs 1008 typically contain 15 pictures, after which a new I picture starts a sequence of P and B pictures. Pictures are coded and decoded in a different order than they are displayed. This is due to the use of bidirectional prediction for B pictures.

Source order and encoder input order for a GOP 1008 may be:

I(1) B(2) B(3) P(4) B(5) B(6) P(7) B(8) B(9) P(10) B(11) B(12) I(13)

Encoding order and order in the coded bit stream for a GOP 1008 may be:

I(1) P(4) B(2) B(3) P(7) B(5) B(6) P(10) B(8) B(9) I(13) B(11) B(12)

Decoder output order and display order is the same as the encoder input order:

I(1) B(2) B(3) P(4) B(5) B(6) P(7) B(8) B(9) P(10) B(11) B(12) I(13)

The video sequence 1010 includes a sequence header, one or more GOPs 1008, and an end-of-sequence code. The header contains information about the picture. The video sequence 1010 is also known as the video elementary stream.

IV. b) MPEG-2 Encoder

Figure 2:
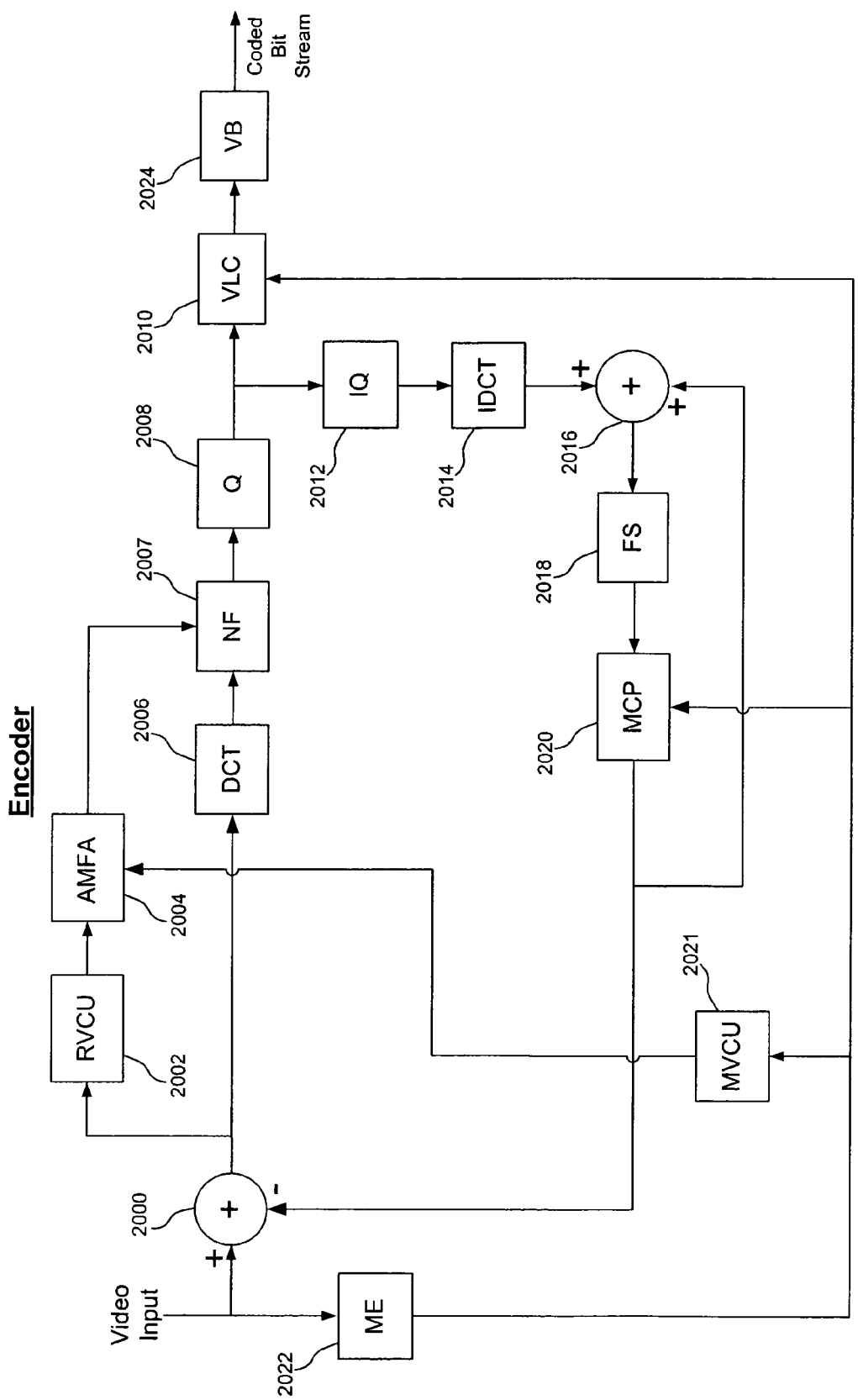
FIG. 2 is a block diagram of an example MPEG-2 encoder.

FIG. 2 is a block diagram of an example MPEG-2 encoder with noise detection, classification and reduction elements. The example MPEG-2 encoder includes a subtractor 2000, a residual variance computation unit (RVCU) 2002, an adaptive motion filter analyzer (AMFA) 2004, a DCT unit 2006, a noise filter 2007, a quantizer unit 2008, a variable length coder (VLC) 2010, an inverse quantizer unit 2012, an inverse DCT unit 2014, an adder 2016, a frame storage unit 2018, a motion compensation predictor 2020, a motion vector correlation unit (MVCU) 2021, a motion estimator 2022 and a video buffer 2024.

Typically, the function of an encoder is to transmit a discrete cosine transformed macroblock from the DCT unit 2006 to the decoder, in a bit rate efficient manner, so that the decoder can perform the inverse transform to reconstruct the image. The numerical precision of the DCT coefficients may be reduced while still maintaining good image quality at the decoder. This is done by the quantizer 2008. The quantizer 2008 is used to reduce the number of possible values to be transmitted thereby reducing the required number of bits. The 'quantizer level', 'quantization level' or 'degree of quantization' determines the number of bits assigned to a DCT coefficient of a macroblock. The quantization level applied to each coefficient is weighted according to the visibility of the resulting quantization noise to a human observer. This results in the high-frequency coefficients being more coarsely quantized than the low-frequency coefficients. The quantization noise introduced by the encoder is not reversible in the decoder, making the coding and decoding process lossy.

Macroblocks of an image to be encoded are fed to both the subtractor 2000 and the motion estimator 2022. The motion estimator 2022 compares each of these new macroblocks with macroblocks in a previously stored reference picture or pictures. The motion estimator 2022 finds a macroblock in a reference picture that most closely matches the current macroblock. The motion estimator 2022 then calculates a 'motion vector' which represents the horizontal and vertical displacement from the macroblock being encoded to the matching macroblock-sized area in the reference picture. The horizontal displacement is estimated by an 'x motion vector' and the vertical displacement is estimated by a 'y motion vector'. The motion estimator also reads this matching macroblock (known as a 'predicted macroblock') out of a reference picture memory and sends it to the subtractor 2000 which subtracts it, on a pixel by pixel basis, from the current macroblock entering the encoder. This forms an 'error prediction' or 'residual signal' that represents the difference between the predicted macroblock and the current macroblock being encoded. Error prediction is the difference between the information being coded and a predicted reference or the difference between a current block of pixels and a motion compensated block from a preceding or following decoded picture.

The MVCU 2021 is used to compute the correlation between motion vectors of the current macroblock and at least one reference macroblock and the relative size of motion vectors of the current macroblock. The variance of the residual signal is computed using the RVCU 2002. The correlation data and relative motion vector size from MVCU 2021 and the variance data from RVCU 2002 is fed into the AMFA 2004. Using the data from the RVCU 2002 and the MVCU 2021, the AMFA 2004 distinguishes noise from data, classifies the current macroblock according to the level of noise and selectively tags it for the appropriate level of filtering. The residual signal is transformed from the spatial domain by the DCT unit 2006 to produce DCT coefficients. The DCT coefficients of the residual are then filtered by noise filter 2007 using a filter strength specified by the AMFA 2004. The filtered coefficients of the residual from noise filter 2007 are then quantized by the quantizer unit 2008 that reduces the number of bits needed to represent each coefficient. The algorithms, equations and methods employed by the MVCU 2021, RVCU 2002, AMFA 2004 and noise filter 2007 according to embodiments of the invention will be described in detail below.

The quantized DCT coefficients from the quantizer unit 2008 are coded by the VLC 2010 which further reduces the average number of bits per coefficient. The result from the VLC 2010 is combined with motion vector data and side information (including an indication of whether it's an I, P or B picture) and buffered in video buffer 2024. Side information is used to specify coding parameters and is therefore sent in smaller quantities than the main error prediction signal. Variations in coding methods may include trade-offs between the amount of this side information and the amount needed for the error prediction signal. For example, the use of three types of encoded pictures in MPEG-2 allows a certain reduction in the amount of error prediction information, but this must be supplemented by side information identifying the type of each picture.

For the case of P pictures, the quantized DCT coefficients also go through an internal loop that represents the operation of the decoder (a decoder within the encoder). The residual is inverse quantized by the inverse quantizer unit 2012 and inverse DCT transformed by the inverse DCT unit 2014. The predicted macroblock read out of the frame storage unit 2018 (which acts as a reference picture memory) is processed by the motion compensation predictor 2020 and added back to the residual obtained from the inverse DCT unit 2014 by adder 2016 on a pixel by pixel basis and stored back into frame storage unit 2018 to serve as a reference for predicting subsequent pictures. The object is to have the reference picture data in the frame storage unit 2018 of the encoder match the reference picture memory data in the frame storage unit 3010 of the decoder. B pictures are not stored as reference pictures.

The encoding of I pictures uses the same circuit, however no motion estimation occurs and the negative input to the subtractor 2000 is forced to 0. In this case the quantized DCT coefficients represent transformed pixel values rather than residual values as was the case for P and B pictures. As is the case for P pictures, decoded I pictures are stored as reference pictures in the frame storage unit 2018.

For many applications, the bit stream from the VLC 2010 must be carried in a fixed bit rate channel. In these cases, the video buffer 2024 is placed between the VLC 2010 and the channel. The video buffer 2024 is filled at a variable rate by the VLC 2010 and produces a coded bit stream at a constant rate as its output.

IV. c) MPEG-2 Decoder

Figure 3:
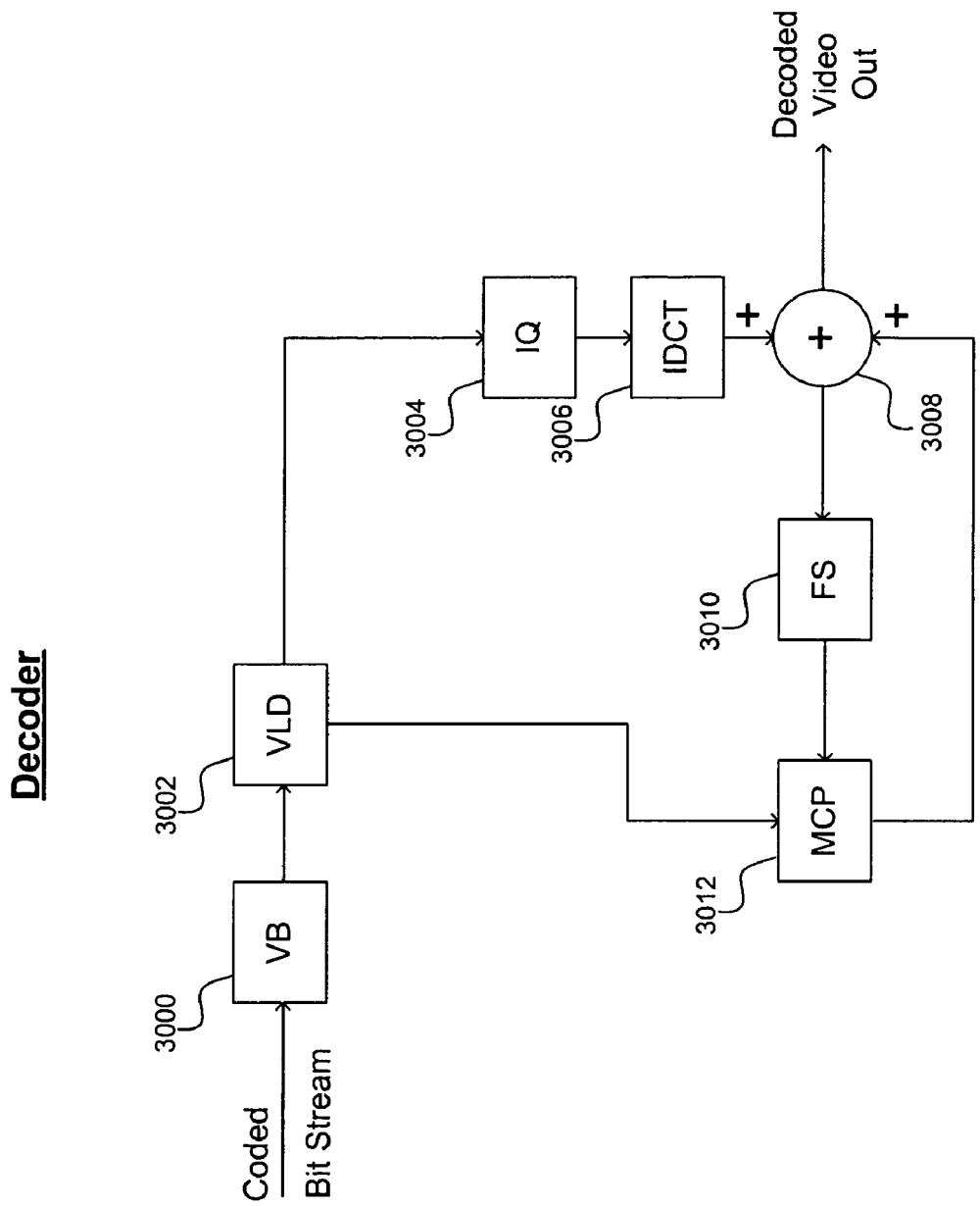
FIG. 3 is a block diagram of an example MPEG-2 decoder.

FIG. 3 is a block diagram of an example MPEG-2 decoder. The decoder includes a video buffer 3000, a variable length decoder (VLD) 3002, an inverse quantizer unit 3004, an inverse DCT unit 3006, an adder 3008, a frame storage unit 3010 and a motion compensation unit 3012.

The decoding process is the reverse of the encoding process. The coded bit stream received by the decoder is buffered by the video buffer 3000 and variable length decoded by the VLD 3002. Motion vectors are parsed from the data stream and fed to the motion compensation unit 3012. Quantized DCT coefficients are fed to the inverse quantizer unit 3004 and then to the inverse DCT unit 3006 that transforms them back to the spatial domain. For P and B pictures, motion vector data is translated to a memory address by the motion compensation unit 3012 to read a particular macroblock (a predicted macroblock) out of a reference picture previously stored in frame storage unit 3010. The adder 3008 adds this prediction to the residual to form reconstructed picture data. For I pictures, there are no motion vectors and no reference pictures, so the prediction is forced to zero. For I and P pictures, the adder 3008 output is fed back to be stored as a reference picture in the frame storage unit 3010 for future predictions.

V. EXAMPLE EMBODIMENTS

Most recorded media content tends to contain some noise. Noise is mostly random, unwanted and spurious variation in a signal. Common sources of noise are electrical and electromagnetic signals external to the recorded media. Noise does not compress well and most video compression systems utilize additional storage space and computational resources to reduce the noise level present in a signal. Noise reduction by filtering can substantially improve the video quality received by the viewer. Selectively removing noise is a challenge because noise shares the same space as picture data. Embodiments of the invention allow powerful suppression of random noise while preserving clean video content. These embodiments employ filters in the DCT domain that preserve details such as edge structure in an image while avoiding blurring, trailing or other effects adverse to the fidelity of the image. Most filtering algorithms such as Motion Compensated Temporal Filtering (MCTF) add a heavy pre-filtering computational load on the encoder. This is a common problem with temporal processors. Therefore, another advantage of the present invention is the utilization of temporal filtering in the DCT domain, within the regular encoding process, thereby obviating the need for temporal pre-processing and minimizing the additional computational load on the encoder. In some embodiments, no additional hardware is required for implementation since the algorithms and equations can be implemented in firmware.

Some embodiments of the invention assume that noise has no spatial correlation and is characterized by high frequencies. This leads to the assumption that noise in the spatial domain transforms to high frequency coefficients in the DCT domain. DCT domain coefficients consist of amplitude and phase and are correlated to frequencies. Since high frequency noise coefficients require the maximum amount of space because of their position in a DCT block, filtering them not only removes noise, but also reduces the number of bits to be encoded. Thus besides removing noise and improving the peak signal to noise ration (PSNR), embodiments of the invention save valuable data space and improve speed and efficiency of the encoder. However, since high frequencies might also represent edges in a picture or other valuable picture data, embodiments of the invention employ motion vector correlation, relative size of motion vectors and variance of residual signals to distinguish noise from data, qualify the noise level if present and select the appropriate filter strength to substantially reduce noise.

V. a) Parameters

To distinguish between noise and image data, some embodiments of the invention may use only correlation of motion vectors. Other embodiments may use the relative size of motion vectors or variance of the residual signal or a combination of these and motion vector correlation. Some embodiments distinguish noise from data based on the assumption that translational motion is in correlation with its surroundings. Another assumption is that large regions in a frame are moving in the same direction at the same speed and that quantization noise from reconstructed pictures is negligible compared to noise present in the source itself.

In calculations, embodiments of the invention employ "temporal distance" which is the distance between similar frames in a video sequence. In embodiments, the temporal distance is also a function of the GOP structure and the picture type. For example in an IBBPBBP . . . video sequence, there is a temporal distance of 2 frames between consecutive P pictures. In calculations, embodiments of the invention use a "correlation threshold" which is measured in pixels (or pels) and is the number of pels movement error allowed per frame. The correlation threshold and/or temporal distance may be the same for x and y motion vectors or may vary depending on the type of picture being encoded or the compression format being used.

In some embodiments, the residual signal is the data which is filtered whereas in other embodiments the actual macroblock may be filtered. Motion correlation is used to determine if the residual signal contains noise or valuable image data. Only macroblocks which are in correlation with at least one reference macroblock are filtered. If the current macroblock is not in correlation with its surrounding it may imply that the current macroblock does not have a suitable reference macroblock and in this case the current macroblock is tagged to not be filtered. In another case, the current macroblock may not be in correlation with reference macroblocks because it is not part of a region having significant translational motion. It can also be a boundary macroblock or a macroblock that has undergone zooming, or rotational movement or some other non-translational movement and therefore should not be filtered. It may also be the case that the residual signal contains data which represents edges or other valuable data in an image. Edges in the spatial domain translate into high frequencies in the DCT domain and have characteristics similar to noise. Since edges contain valuable data, filtering is avoided in this case also. In yet another case, the noise in the current macroblock may be extensive enough to divert the related motion vectors. Filtering might help remove some of this noise but in the event if this macroblock is without a reference or it is an edge macroblock or a macroblock exhibiting non-translational movement, valuable image data would be lost. In this case filtering is again avoided.

Details of formulas and thresholds used to correlate a macroblock with its reference macroblocks, compute the variance of the residual signal and determine the relative size of motion vectors are described in detail below.

V. b) Motion Correlation

The MVCU 2021 is used to determine if a macroblock is in correlation with its surroundings. The x motion vector and y motion vector of each current macroblock is in correlation with a reference macroblock if:

ABS (x motion vector of current macroblock−x motion vector of reference macroblock)<(correlation threshold× temporal distance) and ABS (y motion vector of current macroblock−y motion vector of reference macroblock)<(correlation threshold× temporal distance)

The above comparison is performed for at least one reference macroblock. The correlation data computed by the MVCU 2021 is provided to the AMFA 2004 for analysis.

Figure 4:
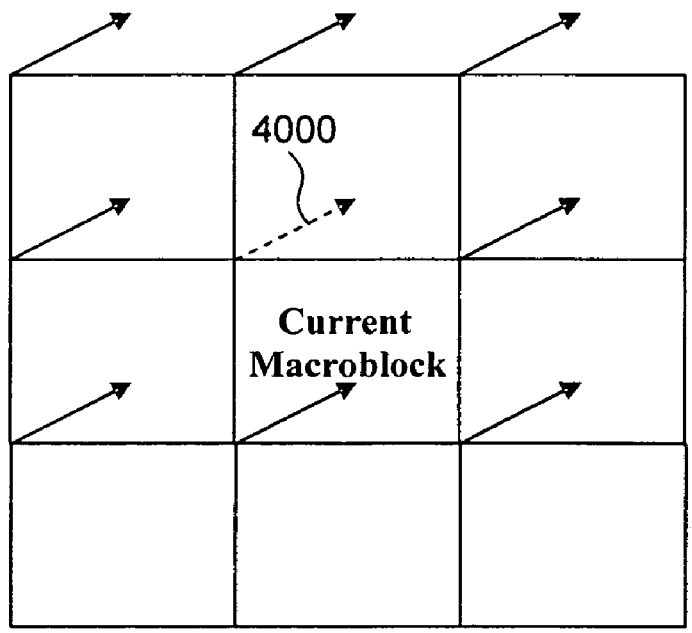
FIG. 4A illustrates an example of correlated macroblock motion vectors.
FIG. 4B illustrates an example of uncorrelated macroblock motion vectors.
Figure 4:
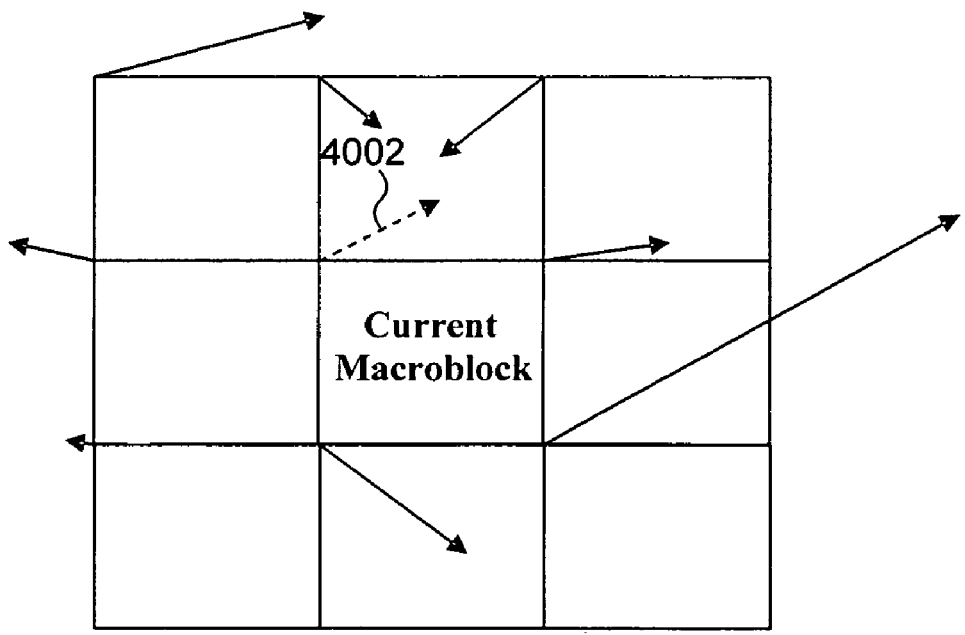

FIG. 4A illustrates an example of when a motion vector is in correlation with reference macroblocks. In FIG. 4A, the motion vector 4000 of the current macroblock is in correlation with the motion vectors of the surrounding reference macroblocks because it is consistent with the reference macroblock motion vectors. Thus the current macroblock is in correlation with its surroundings.

FIG. 4B illustrates an example of when a motion vector is not in correlation with reference macroblocks. In FIG. 4B, the motion vector 4002 of the current macroblock is not in correlation with the motion vectors of reference macroblocks because it is inconsistent with the reference macroblock motion vectors. The motion vector directions and degree of correlation presented in FIGS. 4A and 4B are examples and may vary in embodiments.

V. c) Relative Motion Vector Size

The MVCU 2021 is also used to determine the relative size of a motion vector by comparing it to a correlation threshold. The comparison of the motion vector size of the current macroblock to the correlation threshold is one of the factors used to determine the filter strength to be used on the current macroblock. In some embodiments, a motion vector of the current macroblock must be larger than the correlation threshold to compute a correlation between the current macroblock and a reference macroblock. Motion vectors smaller than the correlation threshold may be marked as correlated even if there is no translational movement present since their size might be a function of a lower zooming level, rotation, panning or other non-translational movement. The small size of a motion vector may also be due to small uncorrelated translational movement. Macroblocks which are larger than the correlation threshold may be coarse filtered and those that are smaller than the correlation threshold may be fine filtered. In embodiments, the correlation threshold used to determine the relative size of a motion vector may or may not be the same as the correlation threshold used to compute the correlation of a macroblock with reference macroblocks. Instead of using MVCU 2021, other embodiments may use a separate unit to determine the relative size of motion vectors.

V. d) Variance of Residual Signal

The RVCU 2002 is used to compute the variance of the residual signal of the current macroblock given by:

Variance of residual signal=$E(x^2)-E^2(x)$ where x is a pixel of the residual signal in the spatial domain.

High variance of the residual signal implies that higher frequencies of the DCT coefficients contain actual image data and not just noise. This is because noise tends to spread uniformly over the residual signal and therefore does not increase the variance while high frequencies of information (such as edges) are present in specific regions of the residual signal thereby resulting in a high variance.

The variance of the residual signal computed by the RVCU 2002, the correlation of macroblocks and the relative size of motion vectors computed by the MVCU 2021 is provided to the AMFA 2004 for analysis.

V. e) Classifying and Tagging Macroblocks

The AMFA 2004 uses correlation and relative motion vector size data from the MVCU 2021 and the variance data from the RVCU 2002, to distinguish noise from data, to determine the strength of the filter to be applied and tag the macroblocks accordingly. The filter strength is a function of the motion vector and the residual variance. The strength of the filter is in direct proportion to the size of the motion vector and in inverse proportion to the variance of the residual.

Figure 5:
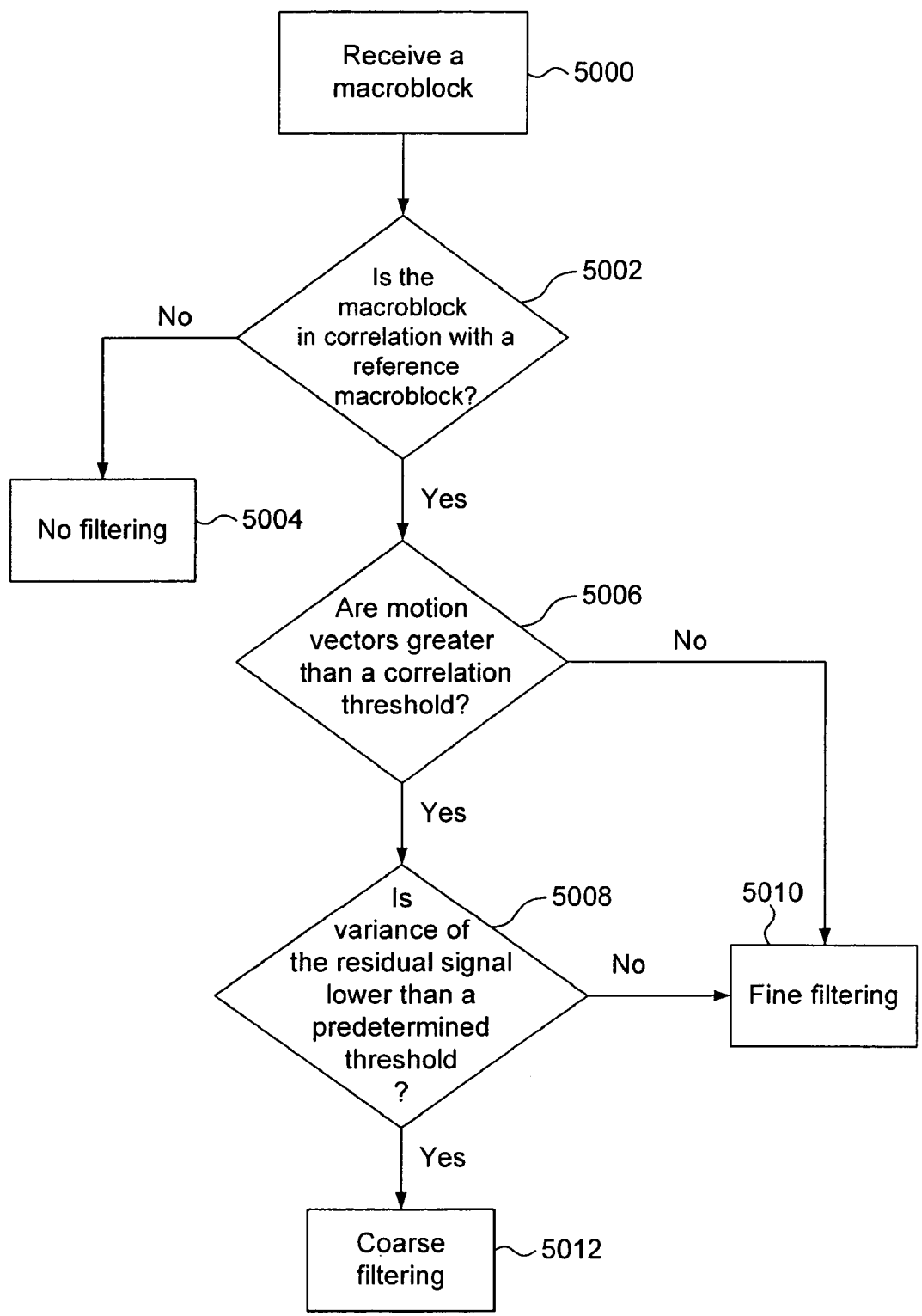
FIG. 5 is an exemplary flowchart showing steps according to an embodiment of the invention.

FIG. 5 provides the details of the algorithm used by the AMFA 2004 to classify and tag macroblocks for filtering. In step 5000, the AMFA 2004 receives the residual signal of the current macroblock. In step 5002, using the correlation data provided by the MVCU 2021, the AMFA 2004 determines if the current macroblock is in correlation with at least one reference macroblock. In step 5004, if the current macroblock is not in correlation with its reference macroblocks, then it is tagged to not be filtered and passed on to the noise filter 2007. In step 5006, if the current macroblock is in correlation with its reference macroblocks, using data from MVCU 2021, it is determined if the x and y motion vectors of the current macroblock are greater than a correlation threshold. In step 5010, if the motion vectors are smaller than the correlation threshold, the current macroblock is tagged for fine filtering and passed on to the noise filter 2007. In step 5008, if the x and y motion vectors of the current macroblock are greater than a predetermined threshold, then using data from the RVCU 2002 it is determined if the variance of the residual signal of the current macroblock is lower than a predetermined threshold. In step 5010, if the variance of the residual signal of the current macroblock is greater than a predetermined threshold, it is tagged for fine filtering and passed on to the noise filter 2007. In step 5012, if the variance of the residual signal of the current macroblock is lower than a predetermined threshold, it is tagged for coarse filtering and passed on to the noise filter 2007. The steps presented in the flowchart in FIG. 5 serve as an example embodiment of the invention. Other embodiments may alter the order of the steps without departing from the spirit of the invention.

V. f) Filtering

Figure 6:
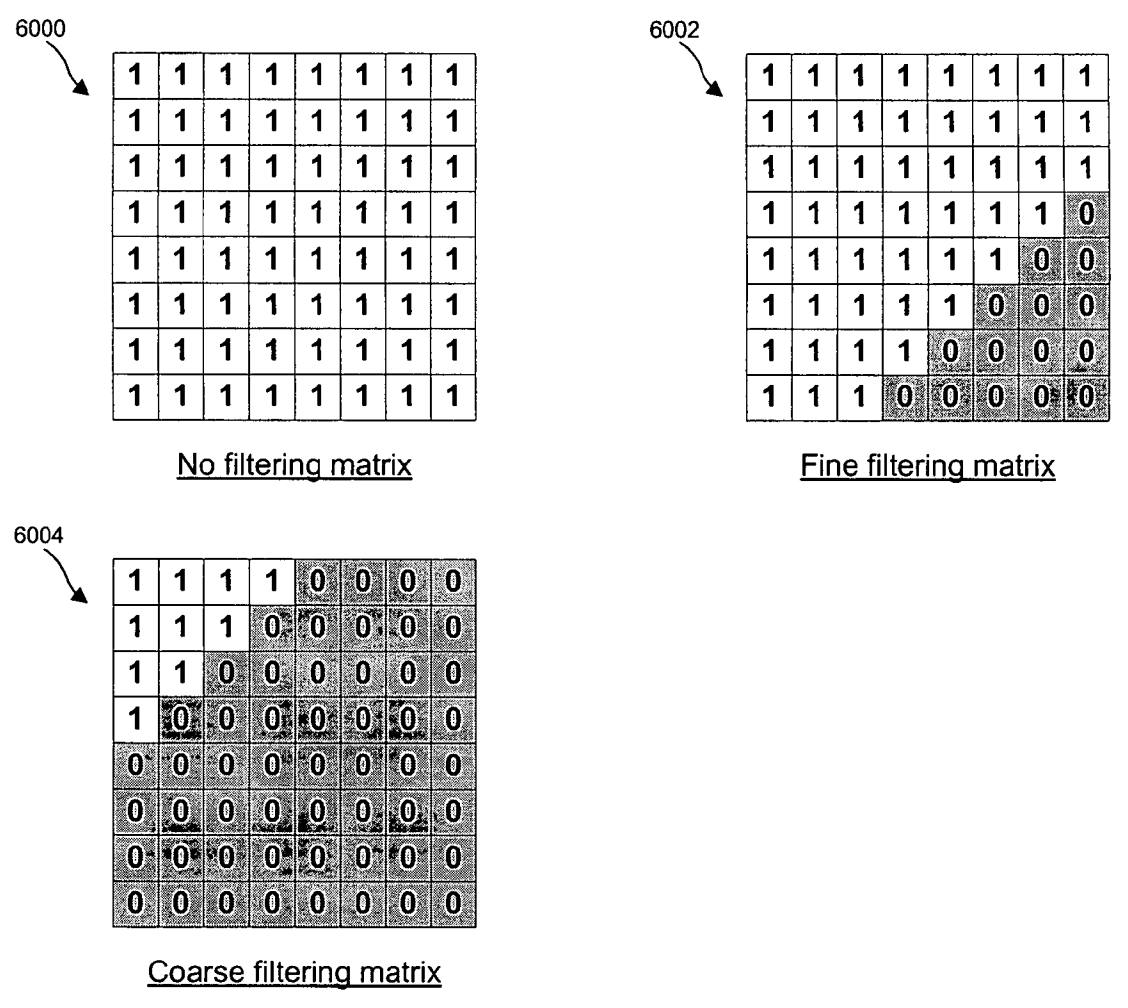

FIG. 6 illustrates examples of filter matrices used for fine filtering 6002, coarse filtering 6004 and for no filtering 6000. Each square shown in the filter matrices contains a real number and has a one to one correspondence with a square in a DCT coefficients matrix of the residual signal of the current macroblock. The DCT coefficients matrix was tagged by the AMFA 2004 with the strength of filter to be applied. Each value in a square of a filter matrix determined by AMFA 2004 is multiplied with the value in the corresponding square in a DCT coefficients matrix and the resulting filtered matrix is passed on to the quantizer unit 2008 for quantization. The no filtering matrix 6000 is populated with ones thereby preserving the original DCT coefficients. In other embodiments if a macroblock is tagged to not be filtered, it may be passed unfiltered by skipping the noise filter 2007 and be directly quantized by quantization unit 2008. Bypassing the noise filter 2007 is essentially the same as multiplying each DCT coefficient with a one. The fine filtering matrix is partially populated with zeros in the higher coefficients region thereby filtering higher frequency noise coefficients to zero. The coarse filtering matrix is significantly populated with zeroes thereby filtering most of the DCT coefficients to zero. These are only example matrices used in some embodiments of the invention. In other embodiments a greater gradation of filters may be used by adjusting the number of zeros and ones according to need. In other embodiments, any real number may be employed instead of ones and zeros for the desired level of filtering. Further computations such as amplifying or subduing certain values of the DCT coefficients matrix may also be accomplished by using other real numbers to change the values of a DCT coefficients matrix. This allows for further applications than filtering noise.

VI. ALTERNATE EMBODIMENTS

In the MPEG-2 environment, embodiments of the invention are implemented according to the type of picture (i.e. I, P or B picture). No filtering is done on I-pictures because there is no temporal information in them. Furthermore, P-pictures and B-pictures may use different correlation and temporal distance thresholds because of a different GOP structure and because a P-picture is a reference picture while a B-picture is not. In other embodiments, filtering may be done only on one of an I, P or B picture or on any combination thereof.

The resolution for motion vector correlation may be in the units of motion vectors. MPEG-2 provides a motion correlation resolution of a macroblock. Other standards such as Advanced Video Coding (AVC) may provide finer resolutions for motion vector correlation. Codecs other than MPEG-2 also use motion vectors. Since correlation and variance can be calculated for other formats regardless of the method of encoding or decoding, the embodiments presented herein are applicable to other video compression and video encoding formats.

In the example embodiments an image 1006 is in a 4:2:0 MPEG-2 format with a macroblock 1002 consisting of four blocks of 8×8 Y values 1012 in a window of 16×16 pixels of the original picture and their associated $C_B$ 1014 and $C_R$ 1016 values. The number of chroma blocks in the macroblock depends on the sampling structure (4:4:4, 4:2:2 or 4:2:0). It is apparent to a person skilled in the relevant art(s) that the number of blocks and the terms block and macroblock are only presented as examples and that the embodiments are applicable to any image format. The number of pixels in a block and the number of blocks in a macroblock are also arbitrary and can vary in different embodiments of the invention.

In the current embodiment the reference macroblocks used for correlation can either be the surrounding or adjacent macroblocks such as the previous, next or diagonally adjacent macroblock. In other embodiments, the reference macroblock can either be any macroblock above, below, before or after the current macroblock or any combination thereof.

In embodiments, the noise filter 2007 and quantizer unit 2008 may be combined in a single unit such as an alpha blend DCT quantization filter that performs the filtering and quantization operations simultaneously. In the example embodiments presented above, the MVCU 2021, RVCU 2002, AMFA 2004 and noise filter 2007 are used to distinguish noise from data, classify noise levels, tag macroblocks and filter them accordingly. In other embodiments or in compression methods other than MPEG-2, the MVCU 2021, RVCU 2002, AMFA 2004 and noise filter 2007 can be substituted in other stages of the encoding or decoding process as required. Furthermore, the above units can be used alone or in any other combination to perform different functions. For example, in an embodiment only the variance of the residual computed by the RVCU 2002 may be used to choose a filter strength. MVCU 2021 may be used alone to identify regions of an image having similar translational movement. Although the current invention is directed towards reducing noise by identifying, classifying and filtering noisy macroblocks, the invention and individual aspects of the invention are not limited to this field. For example, aspects of the invention such as correlating macroblocks may be used to identify and operate on regions that have the same motion. Correlating macroblocks may be used to identify a moving object such as a person or a ball and perform a desired operation on the relevant macroblocks. In other embodiments, the MVCU 2021, RVCU 2002, AMFA 2004 and noise filter 2007 may be used on the decoder side. Since the decoder performs the inverse operation of the encoder, these units can be substituted in the appropriate place in the decoder to identify and filter the noise before the decoding process is completed.

In embodiments of the invention it is assumed that movement is usually consistent over large regions. Therefore all the macroblocks in these regions should have approximately the same motion vectors and these should be in correlation. This means that if a motion vector is in correlation with its environment its reliability is high. By measuring the reliability of motion vectors, motion correlation will be more accurate and hence the correlation used to detect the noise level and select the filter strength will be more accurate.

In embodiments of the invention, accuracy of motion vectors can be improved by applying techniques such as Sum of Absolute Differences Quantized (SADQ) instead of Sum of Absolute Differences (SAD) in the motion estimator 2022. In some embodiments noise is assumed to have a Gaussian distribution with a zero mean i.e. it affects the lower bits of data. The number of bits affected depend on the SNR. Using SADQ instead of SAD reduces the effect of the noise since SADQ quantizes the lower bits. In embodiments where noise has a distribution other than Gaussian, appropriate modifications can be made to the algorithm as is obvious to a person skilled in the relevant art(s).

Another technique that may be used to improve accuracy of motion vectors is to only use motion vectors which are correlated to their environment. This is because noise is random (while image data is generally not random) and tends to increase the entropy of motion vectors. Favoring correlated macroblocks over uncorrelated macroblocks in calculations decreases the effects of the noise on the motion vectors. In embodiments, this may be done by using Weighted Sum of Absolute Differences (WSAD) instead of SAD in the motion estimator 2022. A SAD operation in the motion estimator 2022 provides the motion vector which points to a macroblock whose SAD from the current macroblock is minimal. Using a WSAD instead of SAD when the cost of each motion vector is a function of the SAD and the Motion Vector Distance (MVD) from the predicted motion vector improves the overall accuracy of the scheme.

In some embodiments, a current macroblock is in correlation with a reference macroblock only if both the x and y motion vectors of the current macroblock are in correlation with the respective x and y motion vectors of at least one reference macroblock. Correlation may also be determined by correlating just one of an x or y motion vector of the current macroblock with those of a reference macroblock. The method to determine correlation and the thresholds associated may vary. If a macroblock is not in correlation with at least one reference macroblock no filtering may be done on that macroblock. In some embodiments, the current macroblock may be correlated with only one reference macroblock whereas other embodiments may correlate the current macroblock with multiple reference macroblocks. The number of reference macroblocks used for correlation and their position relative to the current macroblock is arbitrary and may vary. Other parameters such as pattern of correlation, accuracy of correlation etc. . . . may be also be used to identify, qualify and tag noisy macroblocks for filtering.

The filter used may be a function of the type of noise and the statistical distribution it may have. In embodiments, noisy macroblocks may undergo filtering by using Gaussian masks (if noise is assumed to have a Gaussian distribution), median filters, averaging filters or a combination of these and other methods instead of the filter matrices shown in FIG. 6.

As used herein, the terms "image", "picture", "frame" and the plural form of these terms are used interchangeably throughout this document and are used to denote individual images that comprise a video stream as is apparent to a person skilled in the relevant art(s).

The example embodiments presented herein are described in relation to video compression. The invention however, is not limited to these example embodiments, coding standards or video compression. Based on the description herein, a person skilled in the relevant art(s) will understand that the invention can be applied to other applications and a wide variety of image/video standards and compression formats.

The present invention, or portions thereof, can be implemented in hardware, firmware, software, and/or combinations thereof.

Figure 7:
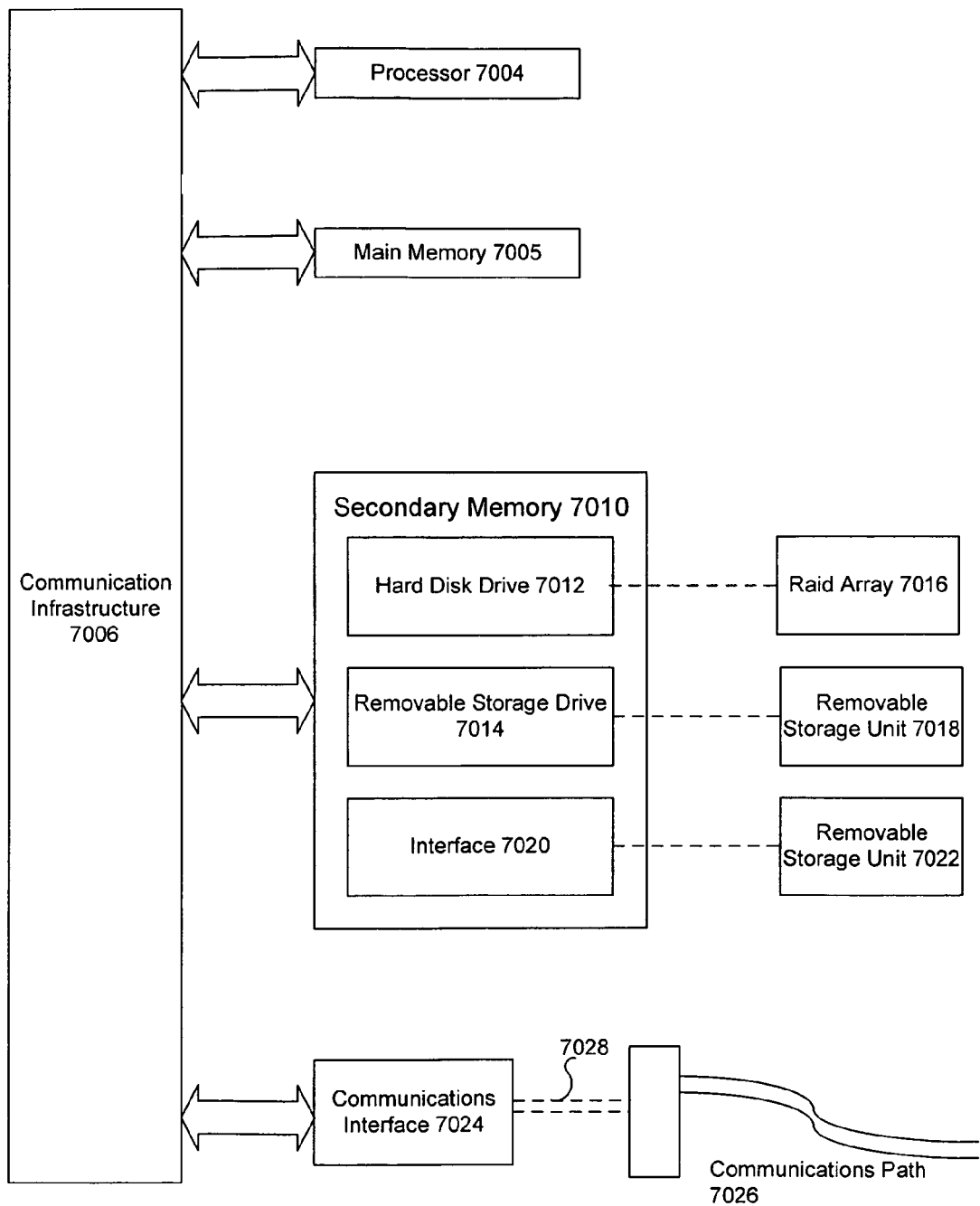
FIG. 7 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 7000 is shown in FIG. 7. The computer system 700 includes one or more processors, such as processor 7004. Processor 7004 can be a special purpose or a general purpose digital signal processor. The processor 7004 is connected to a communication infrastructure 7006 (for example, a bus or network). Various software implementations are described in terms of this exemplary computer system. After reading this description, it will become apparent to a person skilled in the relevant art how to implement the invention using other computer systems and/or computer architectures.

Computer system 7000 also includes a main memory 7005, preferably random access memory (RAM), and may also include a secondary memory 7010. The secondary memory 7010 may include, for example, a hard disk drive 7012, and/or a RAID array 7016, and/or a removable storage drive 7014, representing a floppy disk drive, a magnetic tape drive, an optical disk drive, etc. The removable storage drive 714 reads from and/or writes to a removable storage unit 7018 in a well known manner. Removable storage unit 7018, represents a floppy disk, magnetic tape, optical disk, etc. As will be appreciated, the removable storage unit 7018 includes a computer usable storage medium having stored therein computer software and/or data.

In alternative implementations, secondary memory 7010 may include other similar means for allowing computer programs or other instructions to be loaded into computer system 7000. Such means may include, for example, a removable storage unit 7022 and an interface 7020. Examples of such means may include a program cartridge and cartridge interface (such as that found in video game devices), a removable memory chip (such as an EPROM, or PROM) and associated socket, and other removable storage units 7022 and interfaces 7020 which allow software and data to be transferred from the removable storage unit 7022 to computer system 7000.

Computer system 7000 may also include a communications interface 7024. Communications interface 7024 allows software and data to be transferred between computer system 7000 and external devices. Examples of communications interface 7024 may include a modem, a network interface (such as an Ethernet card), a communications port, a PCM-CIA slot and card, etc. Software and data transferred via communications interface 7024 are in the form of signals 7028 which may be electronic, electromagnetic, optical or other signals capable of being received by communications interface 7024. These signals 7028 are provided to communications interface 7024 via a communications path 7026. Communications path 7026 carries signals 7028 and may be implemented using wire or cable, fiber optics, a phone line, a cellular phone link, an RF link and other communications channels.

The terms "computer program medium" and "computer usable medium" are used herein to generally refer to media such as removable storage drive 7014, a hard disk installed in hard disk drive 7012, and signals 7028. These computer program products are means for providing software to computer system 7000.

Computer programs (also called computer control logic) are stored in main memory 7008 and/or secondary memory 7010. Computer programs may also be received via communications interface 7024. Such computer programs, when executed, enable the computer system 7000 to implement the present invention as discussed herein. In particular, the computer programs, when executed, enable the processor 7004 to implement the processes of the present invention. Where the invention is implemented using software, the software may be stored in a computer program product and loaded into computer system 7000 using raid array 7016, removable storage drive 7014, hard drive 7012 or communications interface 7024.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

VII. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method to filter an image of a video stream using a processor, said image divided into macroblocks, each macroblock including a plurality of luma blocks and a plurality of chroma blocks, wherein each luma and chroma block includes an array of pixels, comprising:
   a) determining correlation of a macroblock with at least one reference macroblock using said processor;
   b) comparing motion vectors of said macroblock to a first predetermined threshold using said processor;
   c) comparing variance of a residual signal of said macroblock to a second predetermined threshold using said processor;
   d) filtering noise in said macroblock based on at least one of steps (a), (b) and (c) using said processor; and
   e) repeating steps a) through d) for each macroblock in said image using said processor.

2. The method of claim 1, further comprising determining said residual signal by computing a difference between said macroblock and a predicted macroblock.

3. The method of claim 2, further comprising obtaining said predicted macroblock from a reference memory.

4. The method of claim 1, further comprising fine filtering said macroblock if said macroblock is in correlation with at least one reference macroblock and if said motion vectors of said macroblock are less than a predetermined threshold.

5. The method of claim 1, further comprising, fine filtering said macroblock if said macroblock is in correlation with at least one reference macroblock and if said motion vectors of said macroblock are greater than a first predetermined threshold and if variance of said residual signal is greater than a second predetermined threshold.

6. The method of claim 1, further comprising coarse filtering said macroblock if said macroblock is in correlation with at least one reference macroblock and if said motion vectors of said macroblock are greater than a first predetermined threshold and if variance of said residual signal is lower than a second predetermined threshold.

7. The method of claim 1, wherein said correlation of a macroblock with a reference macroblock is determined by computing a correlation between motion vectors of said macroblock and motion vectors of said reference macroblock.

8. The method of claim 1, further comprising passing said macroblock unfiltered if said macroblock is not in correlation with at least one reference macroblock.

9. A system to encode an image of a video stream, said image divided into macroblocks, each macroblock including a plurality of luma blocks and a plurality of chroma blocks, wherein each luma and chroma block includes an array of pixels, comprising:
  a) a motion vector correlation unit enabled to correlate a macroblock with a reference macroblock and compare motion vectors of said macroblock to a predetermined threshold;
  b) a residual variance computation unit enabled to compute variance of a residual signal of said macroblock;
  c) a adaptive motion filter analyzer coupled to said motion vector correlation unit and said residual variance computation unit and enabled to determine a filter strength for said macroblock based on data provided by motion vector correlation unit and said residual variance computation unit; and
  d) a noise filter coupled to said adaptive motion filter analyzer and enabled to filter noise in said macroblock using a filter as determined by said adaptive motion filter analyzer.

10. The system of claim 9, wherein said residual signal is determined by computing a difference between said macroblock and a predicted macroblock.

11. The system of claim 10, wherein said predicted macroblock is obtained from a reference memory.

12. The system of claim 9, wherein a macroblock is fine filtered by said noise filter if said macroblock is in correlation with at least one reference macroblock and if said motion vectors of said macroblock are less than a predetermined threshold.

13. The system of claim 9, wherein a macroblock is fine filtered by said noise filter if said macroblock is in correlation with at least one reference macroblock and if said motion vectors of said macroblock are greater than a first predetermined threshold and if variance of said residual signal is greater than a second predetermined threshold.

14. The system of claim 9, wherein a macroblock is coarse filtered by said noise filter if said macroblock is in correlation with at least one reference macroblock and if said motion vectors of said macroblock are greater than a first predetermined threshold and if variance of said residual signal is lower than a second predetermined threshold.

15. The system of claim 9, wherein said correlation of a macroblock with at least one reference macroblock is determined by computing a correlation between motion vectors of said macroblock and motion vectors of said at least one reference macroblock.

16. The system of claim 9, wherein a macroblock is passed unfiltered if said macroblock is not in correlation with at least one reference macroblock.

17. A method to identify noise in an image of a video stream using a processor, said image divided into macroblocks, wherein each macroblock includes an array of pixels, comprising:
  a) determining correlation of a macroblock with at least one reference macroblock using said processor;
  b) comparing motion vectors of said macroblock to a first predetermined threshold using said processor;
  c) comparing variance of a residual signal of said macroblock to a second predetermined threshold using said processor;
  d) identifying noise in said macroblock based on at least one of steps (a), (b) and (c) using said processor; and
  e) repeating steps a) through d) for each macroblock in said image using said processor.

18. The method of claim 17, further comprising determining said residual signal by computing a difference between said macroblock and a predicted macroblock.

19. The method of claim 18, further comprising obtaining said predicted macroblock from a reference memory.

20. The system of claim 17, wherein said correlation of a macroblock with at least one reference macroblock is determined by computing a correlation between motion vectors of said macroblock and motion vectors of said at least one reference macroblock.

* * * * *

UNITED STATES PATENT AND TRADEMARK OFFICE
CERTIFICATE OF CORRECTION

| | | |
|---|---|---|
| PATENT NO. | : 7,920,628 B2 | Page 1 of 1 |
| APPLICATION NO. | : 11/206177 | |
| DATED | : April 5, 2011 | |
| INVENTOR(S) | : Kojokaro et al. | |

It is certified that error appears in the above-identified patent and that said Letters Patent is hereby corrected as shown below:

In column 17, line 44, replace "by motion" with --by said motion--.

Signed and Sealed this
Ninth Day of August, 2011

David J. Kappos
*Director of the United States Patent and Trademark Office*